United States Patent [19]

Krishnamohan et al.

[11] Patent Number: 5,499,355
[45] Date of Patent: Mar. 12, 1996

[54] PREFETCHING INTO A CACHE TO MINIMIZE MAIN MEMORY ACCESS TIME AND CACHE SIZE IN A COMPUTER SYSTEM

[75] Inventors: Karnamadakala Krishnamohan, San Jose; Paul M. Farmwald, Portola Valley; Frederick A. Ware, Los Altos, all of Calif.

[73] Assignee: Rambus, Inc., Mountain View, Calif.

[21] Appl. No.: 339,920

[22] Filed: Nov. 15, 1994

Related U.S. Application Data

[63] Continuation of Ser. No. 847,300, Mar. 6, 1992, abandoned.

[51] Int. Cl.$^6$ .................................................. G06F 13/00
[52] U.S. Cl. ........................ 395/464; 395/414; 395/445; 395/450; 364/263.1; 364/948; 364/243.41; 364/964.22; 364/964.23; 364/964.24; 364/DIG. 1; 364/DIG. 2
[58] Field of Search ................................ 364/948, 957.9, 364/263.1, 243.41, 964.23, 964.24, 964.22; 395/414, 445, 450, 464

[56] References Cited

U.S. PATENT DOCUMENTS

| | | | |
|---|---|---|---|
| 4,247,817 | 1/1981 | Heller | 324/73 |
| 4,481,625 | 11/1984 | Roberts et al. | 370/85 |
| 4,519,034 | 5/1985 | Smith et al. | 395/550 |
| 4,719,568 | 1/1988 | Carrubba et al. | 395/425 |
| 4,785,394 | 11/1988 | Fischer | 395/325 |
| 4,807,110 | 2/1989 | Pomerene et al. | 395/425 |
| 4,811,202 | 3/1989 | Schabowski | 395/325 |
| 4,860,198 | 8/1989 | Takenaka | 395/325 |
| 4,926,323 | 5/1990 | Baror et al. | 395/425 |
| 4,942,520 | 7/1990 | Langendorf | 395/425 |
| 4,980,823 | 12/1990 | Liu | 395/400 |
| 5,007,011 | 4/1991 | Murayama | 395/425 |
| 5,136,697 | 8/1992 | Johnson | 395/375 |
| 5,142,634 | 8/1992 | Fite et al. | 395/375 |
| 5,148,538 | 9/1992 | Celtruda et al. | 395/425 |
| 5,261,066 | 11/1993 | Jouppi et al. | 395/425 |
| 5,317,718 | 5/1994 | Jouppi | 395/425 |

FOREIGN PATENT DOCUMENTS

| | | |
|---|---|---|
| 0449540A2 | 3/1991 | European Pat. Off. . |
| 0457403A2 | 5/1991 | European Pat. Off. . |
| 9102590 | 4/1991 | WIPO . |

OTHER PUBLICATIONS

Elektronische Rechenanlagen–MIT Computer Praxis, vol. 15, No. 2, 1973, Munchen DE, pp. 60–65 (with the English translation).

Improving Direct–Mapped Cache Performance by the Addition of a Small Fully–Associative Cache and Prefetch Buffers, Norman P. Jouppi, Digital Equipment Corp. Western Research Lab.

Algorithm for Non–Sequential Cache Prefetching, IBM Technical Disclosure Bulletin, vol. 34, No. 2, Jul. 1991.

*Primary Examiner*—Tod R. Swann
*Assistant Examiner*—Frank J. Asta
*Attorney, Agent, or Firm*—Blakely, Sokoloff, Taylor & Zafman

[57] ABSTRACT

A cache subsystem for a computer system having a processor and a main memory is described. The cache subsystem includes a prefetch buffer coupled to the processor and the main memory. The prefetch buffer stores a first data prefetched from the main memory in accordance with a predicted address for a next memory fetch by the processor. The predicted address is based upon an address for a last memory fetch from the processor. A main cache is coupled to the processor and the main memory. The main cache is not coupled to the prefetch buffer and does not receive data from the prefetch buffer. The main cache stores a second data fetched from the main memory in accordance with the address for the last memory fetch by the processor only if the address for the last memory fetch is an unpredictable address. The address for the last memory fetch is the unpredictable address if both of the prefetch buffer and the main cache do not contain the address and the second data associated with the address.

21 Claims, 6 Drawing Sheets

PREFETCHING INTO A CACHE TO MINIMIZE MAIN MEMORY ACCESS TIME AND CACHE SIZE IN A COMPUTER SYSTEM

This is a continuation of application Ser. No. 07/847,300, filed Mar. 6, 1992, now abandoned.

FIELD OF THE INVENTION

The present invention pertains to the field of computer architecture. More particularly, this invention relates to cache memories systems for improving data access times.

BACKGROUND OF THE INVENTION

Using dynamic random access memories ("DRAMs") for a high performance main memory for a computer system is often less expensive than using static random access memories ("SRAMs"). Nevertheless, DRAMs are typically much slower than SRAMs.

A common technique for lessening the impact of slow DRAM access time on main processor performance is to employ a cache memory. A cache memory is a limited size fast memory, usually made up of SRAMs, which stores blocks of data, known as lines, that reflect selected main memory locations. A cache memory is smaller than the main memory it reflects, which means the cache memory typically is not fully addressable and must store a tag field for each data line. The tag field identifies the main memory address corresponding a particular data line.

When the main processor issues a read request and an address corresponding to desired data stored in main memory, the cache memory is checked by comparing the received address to the tag fields of the cache memory. If the desired data is stored in the cache, then a "hit" occurs and the desired data is immediately available to the main processor. If the desired data is not stored in the cache, then a "miss" occurs, and the desired data must be fetched from slower main memory. The typical goal in a cache memory design is to increase the hit rate because a low hit rate slows main processor performance.

One prior technique for increasing the hit rate in a cache memory subsystem is to use a prefetch buffer along with a main cache. A prefetch buffer is a memory that stores data prefetched from main memory. Data is speculatively prefetched into the prefetch buffer before a next read request based upon a prediction of the address for the next read request. When the main processor issues the next read request, the desired data may be available from the prefetch buffer if the prediction was accurate. In typical prior art systems, if the prediction was correct, the desired data is moved from the prefetch buffer to the main cache and is supplied to the main processor.

Nevertheless, prior art prefetch schemes that store prefetched data in the main cache often require relatively large main cache memories in order to maintain a high hit rate because the main cache typically becomes cluttered with predictable addresses, which are typically sequential. Unfortunately, larger cache memories increase the cost of the computer system and often preclude placement of effective caches on-chip with the main processor.

SUMMARY AND OBJECTS OF THE INVENTION

One object of the present invention is to minimize data access time in a computer system.

Another object of the present invention is to provide a relatively efficient cache bridge to a main memory.

Another object of the present invention is to minimize the size of the cache memory and to minimize memory access times.

Another object of the present invention is to provide a computer system with a relatively small cache memory with a relatively high hit rate that is comparable with the hit rates of larger cache memories.

A further object of the present invention is to provide an efficient cache memory subsystem suitable for placement on a microprocessor chip.

These and other objects of the invention are provided by a method and apparatus for reducing main memory access time in a computer system. In the cache memory subsystem of the present invention, an address corresponding to a data line stored in the main memory is received from a main processor, along with a read request. The address is received by an instruction prefetch buffer, a data prefetch buffer, and a main cache. If a hit occurs on one of the prefetch buffers, the data line is read from the prefetch buffer and transferred to the main processor. If a main cache hit occurs, then the desired data is read from the main cache and transferred to the main processor. If a main cache miss and prefetch miss occurs, then the desired data is fetched from main memory, stored in the main cache, and transferred to the main processor. In all cases (hit or miss), after the desired data has been transferred to the main processor, a predicted address is generated. A next data line stored at the predicted address in the main memory is then fetched from the main memory and stored in the appropriate prefetched buffer. As a result, only data at unpredictable addresses are stored in the main cache. Data at predictable addresses do not clutter the main cache, but are instead stored in the instruction and data prefetch buffers.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figures 1, 2:
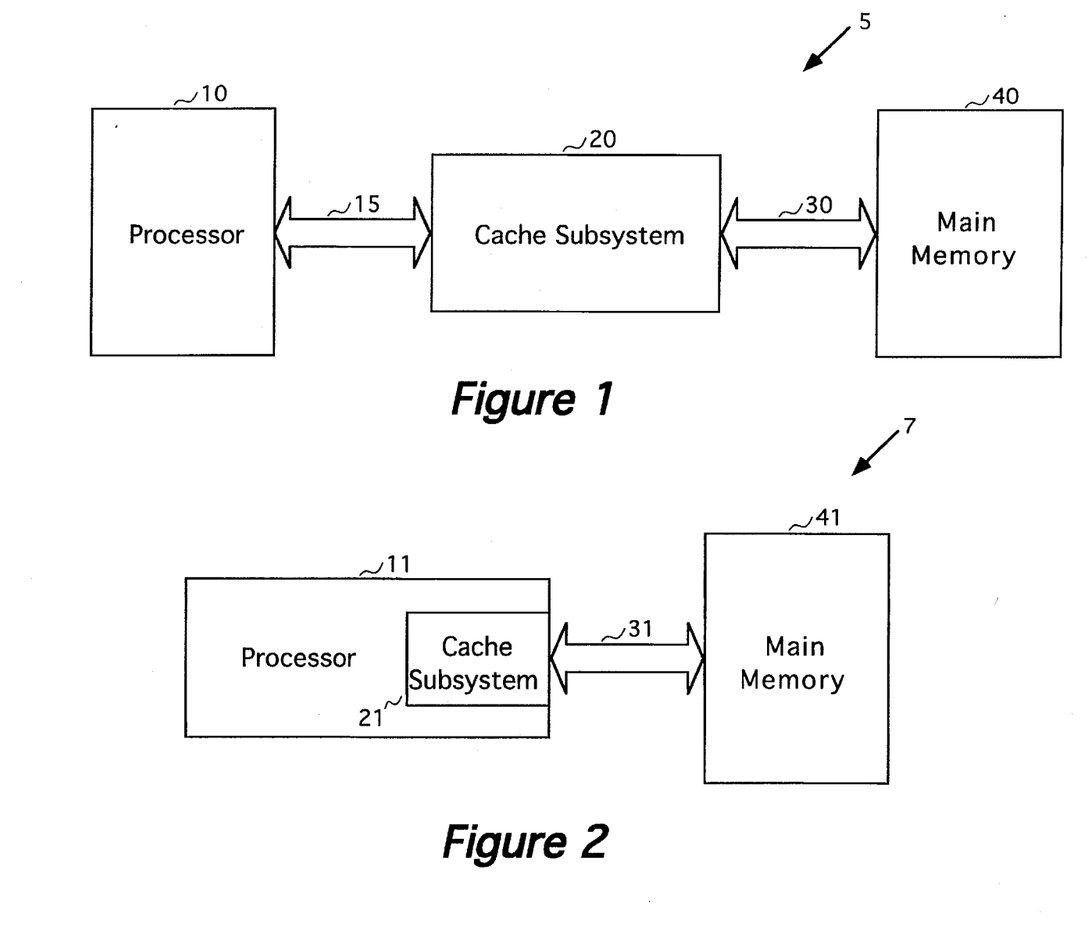
FIG. 1 is a block diagram of a computer system employing a separate cache subsystem.
FIG. 2 shows a computer system with a cache subsystem on a processor chip.

FIG. 1 is a block diagram of the architecture of computer system 5. Computer system 5 includes processor 10 for transferring address, data, and control information to and from cache subsystem 20 over bus 15. Cache subsystem 20 transfers information to and from main memory 40 over high speed bus 30. For the embodiment shown in FIG. 1, cache subsystem 20 comprises circuitry external to processor 10. Cache subsystem 20 is functionally transparent to processor 10. In other words, processor 10 issues read requests and addresses over bus 15 as if processor 10 were directly connected to main memory 40.

As described in more detail below, cache subsystem 20 helps to maximize cache hits while minimizing cache space.

FIG. 2 shows another embodiment of the present invention wherein cache subsystem 21 of computer system 7 resides within processor chip 11. Processor 11 is coupled to cache subsystem 21. Cache subsystem 21 is in turn coupled to main memory 41 via bus 31.

Figure 3:
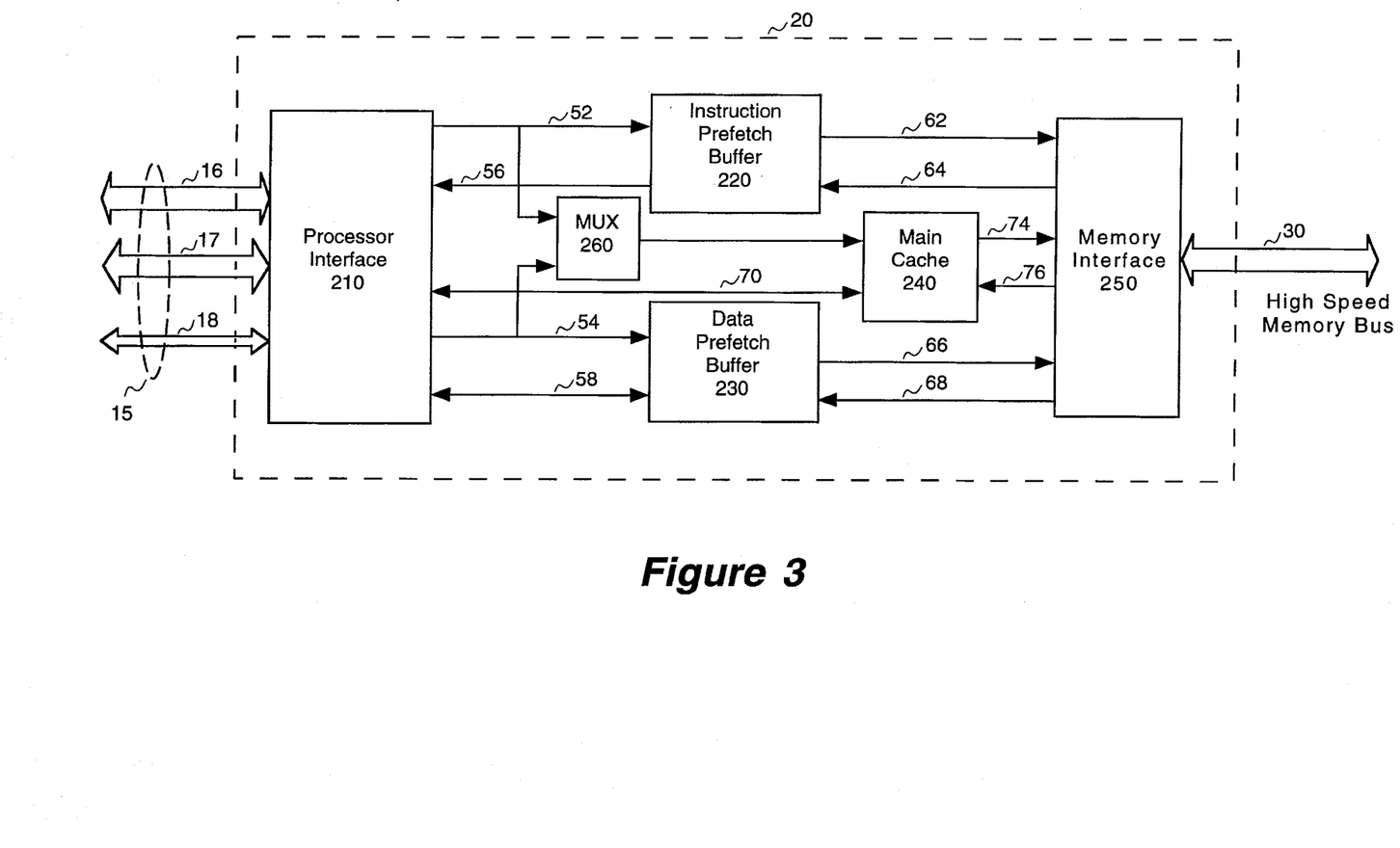
FIG. 3 is a functional block diagram illustrating the address and data paths for one cache memory subsystem.

FIG. 3 shows cache subsystem 20 of FIG. 1. Cache subsystem 20 is comprised of processor interface 210, instruction prefetch buffer 220 ($I_{p/b}$), data prefetch buffer 230 ($D_{p/b}$), main cache 240, and memory interface 250. Processor interface 210 is coupled to received addresses from processor 10 over bus 16. Processor interface 210 transfers data to and from processor 10 over data bus 17, and transfers control information to and from processor 10 over control bus 18. Buses 16, 17, and 18 are part of bus 15 shown in FIG. 1.

$I_{p/b}$ 220 prefetches and buffers instructions for processor 10. $I_{p/b}$ 220 is coupled to receive instruction addresses from processor interface 210 over address path 52, and transfer instructions to processor interface 210 over data path 56. $I_{p/b}$ 220 is coupled to transfer predicted instruction addresses to memory interface 250 over address path 62 and receive next instruction lines over data path 64.

In a similar manner, $D_{p/b}$ 230 prefetches and buffers data for processor 10. $D_{p/b}$ 230 is coupled to receive addresses from processor interface 210 over address path 54 and transfer data to processor interface 210 over data path 58. $D_{p/b}$ 230 transfers predicted data addresses to memory interface 250 over address path 66 and receives next data lines over data path 68.

Main cache 240 holds unpredictable instructions not prefetched by $I_{p/b}$ 220 and unpredictable data not prefetched by $D_{p/b}$ 230. Main cache 240 receives, through multiplexer 260, either instruction addresses 52 or data addresses 54 from processor interface 210. In case of a main cache 240 miss, main cache 240 transfers addresses 74 to memory interface 250 and transfers data 76 to and from memory interface 250.

Figure 4:
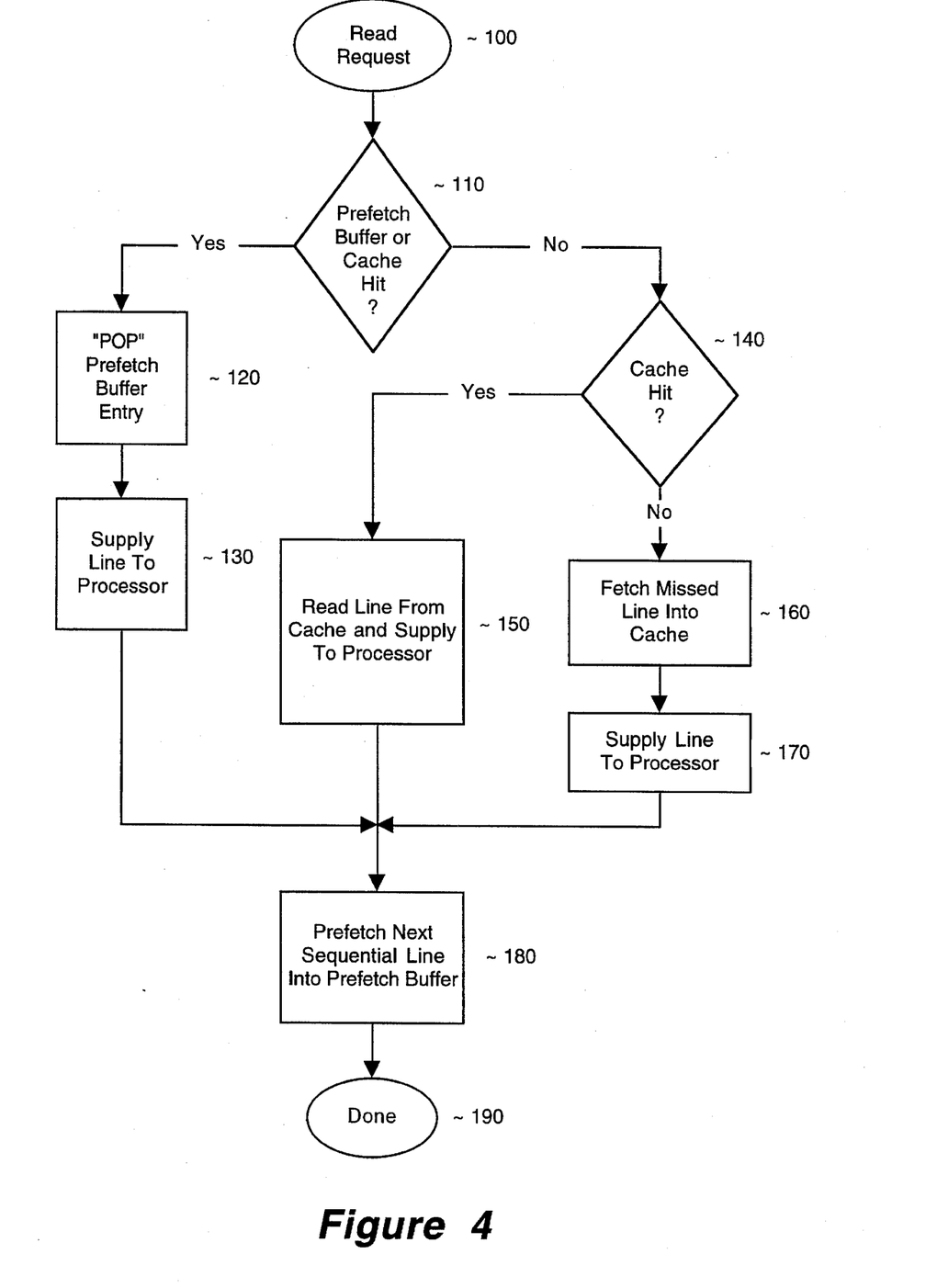
FIG. 4 is a logical flow diagram of the method employed by the cache memory subsystem.

FIG. 4 is a flow diagram of a method employed by cache subsystem 20. At block 100, a read request is received by cache subsystem 20 from processor 10. Processor interface 210 receives the desired address over address bus 16 and receives a read request signal over control bus 18. The received address is routed (1) to $I_{p/b}$ 220 over address path 52, and (2) to $D_{p/b}$ 230 over address path 54, and (3) to main cache 240 through multiplexer 260. A signal on control bus 18 indicates whether the read request is for an instruction fetch or a data fetch.

If control signals 18 indicate an instruction fetch, the instruction prefetch buffer is checked for the desired instruction. This occurs when processor interface 210 transfers instruction address 52 to $I_{p/b}$ 220. On the other hand, if control signals 18 indicate a data fetch, then the data prefetch buffer is checked when processor 210 transfers data address 54 to $D_{p/b}$ 230. The received address—either instruction address 52 or data address 54—is transferred to main cache 240 through multiplexor 260.

At decision block 110, a prefetch buffer or main cache hit is sensed. If a prefetch buffer hit occurs, then control transfers to block 120, wherein the desired line, either instruction or data, is read from the appropriate prefetch buffer, either $I_{p/b}$ 220 or $D_{p/b}$ 230. The prefetch buffer is also "popped" to make room for prefetched instructions or data. Alternatively, the prefetch buffer may not be popped if a larger prefetch buffer is employed. The desired line is then transferred to processor interface 210 over the appropriate data path, either data path 56 or 58. Thereafter, at block 130, processor interface 210 transfers the desired line to processor 10 over data bus 17.

At block 180, a next sequential line is prefetched from main memory 40 into the appropriate prefetch buffer. In the case of an instruction fetch indicated by control signals 18, a next sequential instruction address 62 is transferred from $I_{p/b}$ 220 to memory interface 250. Memory interface 250 accesses main memory 40 over high speed bus 30 and transfers next sequential instruction line 64 to $I_{p/b}$ 220. In the case of a data fetch indicated by control signals 18, a next sequential data address 66 is transferred to memory interface 250 and next sequential data line 68 is transferred from memory interface 250 to $D_{p/b}$ 230 after being fetched from main memory 40. Control then proceeds to block 190, which ends the read request sequence.

If a main cache hit occurs at decision block 110, then control is transferred to block 150, wherein the desired line is read from main cache 240 and supplied to processor 10. The desired line is transferred from main cache 240 to processor interface 210 over data path 70. Control then proceeds to block 180, wherein a next sequential line is prefetched as discussed above.

If a main cache or prefetch buffer hit does not occur at decision block 110, then control transfers to block 160, wherein the "missed" line is fetched into main cache 240. Address 74, which is either the received instruction address 52 or data address 54, is transferred to memory interface 250. After accessing main memory 40, memory interface 250 transfers the desired line 76 to main cache 240. The desired line is stored in main cache 240 and transferred to processor interface 210 over data path 70. Processor interface 210 transfers the desired line to processor 10 over data bus 17. Control then proceeds to block 180, wherein a next sequential line is then prefetched as discussed above.

Figure 5:
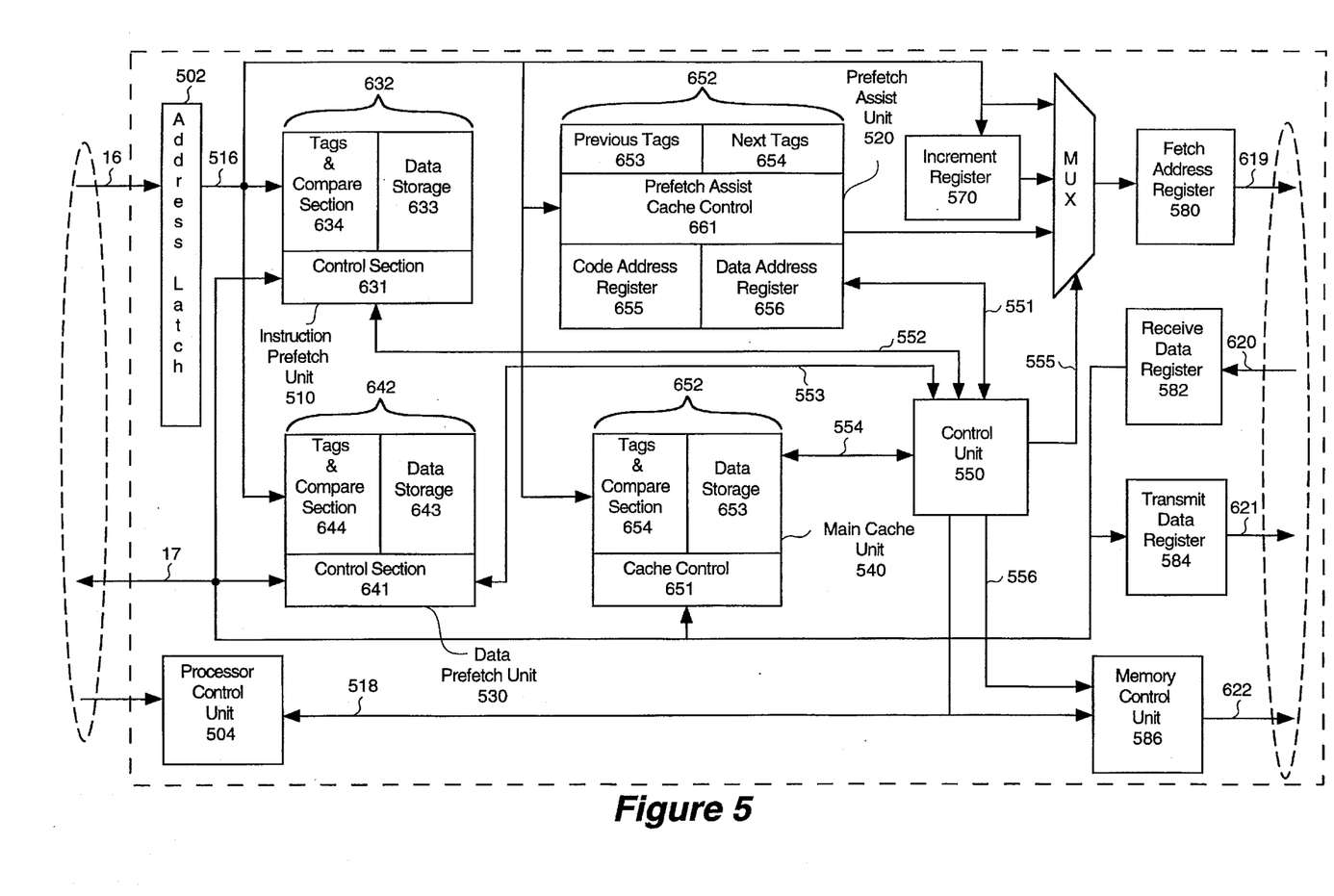
FIG. 5 is a block diagram of the hardware of a cache memory subsystem that employs a prefetch assist unit.

FIG. 5 illustrates cache system 22, which is another embodiment of the present invention. Cache subsystem 22 employs a prefetch assist cache ("PAC"). Cache subsystem 22 functions as a cache bridge between processor 10 and a high performance memory system 40. An example of a high performance main memory system 40 is set forth in PCT international patent application number PCT/US91/02590 filed Apr. 16, 1991, published Oct. 31, 1991, and entitled *Integrated Circuit I/O Using a High Performance Bus Interface.*

Cache subsystem 22 is coupled to processor 10 via bus 15. Cache subsystem 22 is coupled to main memory 40 via bus 30. Cache subsystem 22 is located between processor 10 and main memory 40. Cache subsystem 22 is "transparent" to processor 10. Cache subsystem 22 includes instruction prefetch unit 510, data prefetch unit 530, prefetch assist unit 520, main cache unit 540, and control unit 550. Address latch 502 receives addresses 16 from processor 10. Address latch 502 transmits address signals 516 to instruction prefetch unit 510, data prefetch unit 530, prefetch assist unit 520, and main cache unit 540. Address signals 516 are also received by increment register 570 and multiplexer 560.

Data is transferred between processor 10 and instruction prefetch unit 510, data prefetch unit 530, and main cache unit 540 over bus 17.

Instruction prefetch unit 510 is comprised of a control section ("CFB CTL") 631 and a data storage section 632 comprised of (1) data 633 and (2) tags and compare ("TAGS & CMP") section 634. Control section 631 communicates with control unit 550 over signal lines 552. Data storage section 632 is organized as a set of four fully associative buffers of size 16 bytes each. On an instruction prefetch hit, the desired line is supplied to processor 10, and the entry is "popped" to make room for a new prefetched line. Entries are replaced on a least recently used basis.

Similarly, data prefetch Unit 530 is comprised of a control section ("DFB CTL") 641 and a data storage section 642 comprised of (1) data 643 and (2) tags and compare ("TAGS & CMP") section 644. Control section 641 communicates with control unit 550 over signal lines 553. Data storage section 643 is organized as a set of four fully associative buffers of size 16 bytes each. On a data prefetch hit, the desired line is supplied to processor 10 and the entry is "popped" to make room for a new prefetched line on a least recently used basis.

Main cache unit 540 includes a control section ("CACHE CTL") 651 that communicates with control unit 550 over signal lines 554. Main cache unit 540 also includes data storage section 652 comprised of (1) data 653 and (2) tags and compare ("TAGS & CMP") section 654. Data storage section 652 is organized as an 8 kilobyte 4-way set associative unified cache with least recently used replacement.

Prefetch assist unit 520 is comprised of (1) a control section ("PAC CTL") 661, (2) a data section 652 comprised of previous tags ("PREV TAGS") 653 and next tags ("NEXT TAGS") 654, (3) a last code address register ("CAR") 655, and (4) a last data address register ("DAR") 656. Data section 652 is organized as a 256 entry 4-way set associative cache with least recently used replacement.

CAR 655 and DAR 656 are used in conjunction with desired address 516 to create a new PAC entry in the data section of prefetch assist unit 520. A PAC entry in the data section is comprised of a predicted address ("NEXT TAG") and an associated tag field ("PREV TAGS") defined by the last instruction or data address. The CAR and DAR entries are created by storing desired address 516 in CAR 655 or DAR 656, depending upon whether control signals 18 indicate an instruction read or a data read sequence.

Cache subsystem 22 employs a relatively small main cache to achieve a relatively high hit rate and avoids having a much larger main cache. For example, when employed as a cache bridge to high performance main memory system 40 capable of transferring 500 Megabytes/second, cache subsystem 22 uses only an 8 kilobyte main cache.

Figure 6:
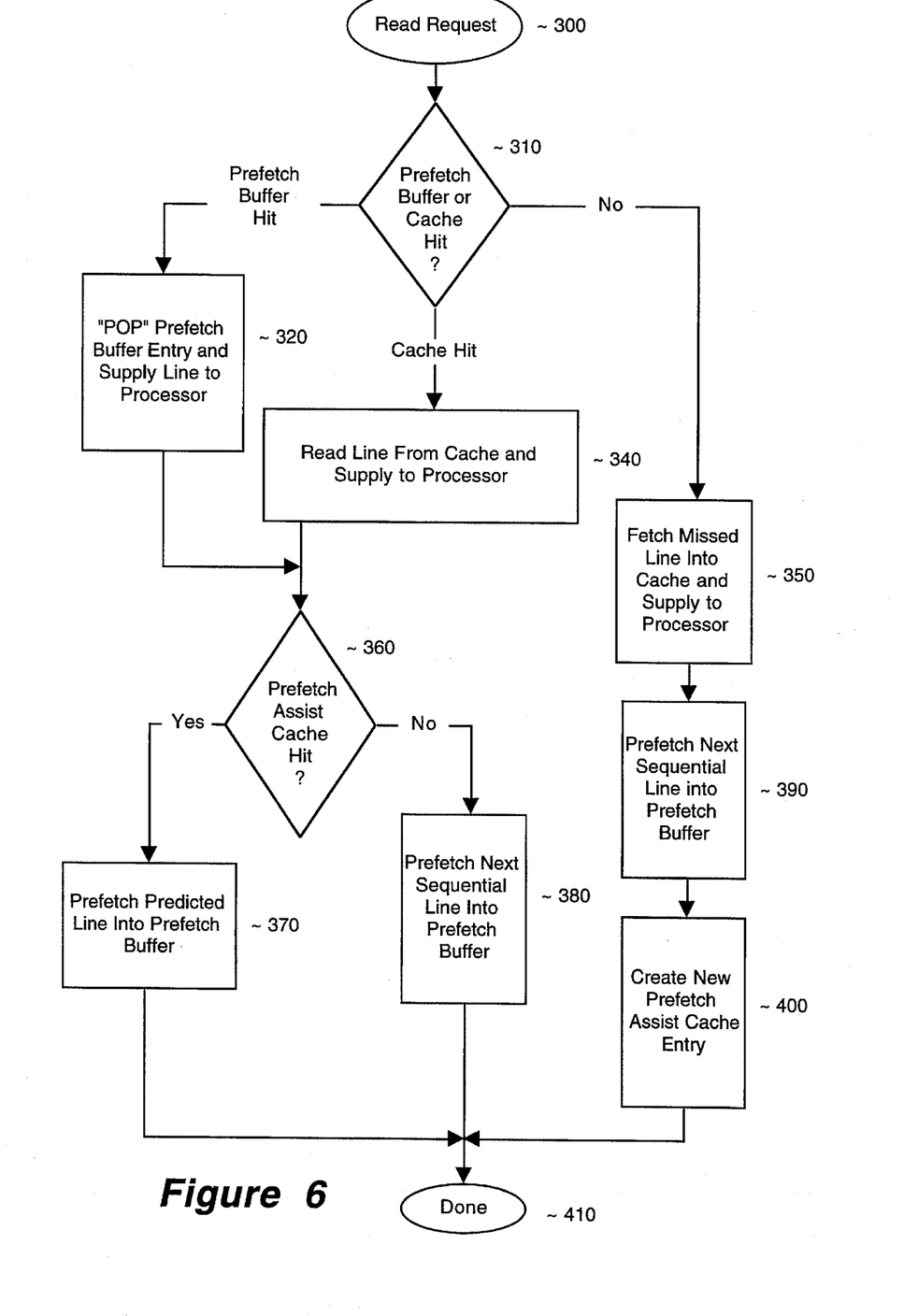
FIG. 6 is a logical flow diagram of the method employed by the cache memory subsystem that has a prefetch assist unit.

FIG. 6 is a flow diagram illustrating the method employed by cache subsystem 22. At block 300, a read request is received by cache subsystem 22 from processor 10. This occurs when address register 502 receives the desired address over address bus 16 and processor control unit 504 receives a read request over control bus 18. The desired address 516 is received by instruction prefetch unit 510, data prefetch unit 530, main cache unit 540, prefetch assist unit 520, increment register 570, and multiplexer 560.

At decision block 310, if control unit 550 senses an instruction prefetch buffer hit via bus 552 or a data prefetch buffer hit via bus 553, then control transfers to block 320, wherein the desired line—either instructions or data—is "popped" from the appropriate prefetch buffer and transferred to processor 10 over data bus 17.

At decision block 360, if prefetch assist hit on bus 551 is sensed by control unit 550, then control is transferred to block 370, wherein control unit 550 issues mux control 555, which causes multiplexor 560 to couple predicted address 521 to fetch address register 580. Control unit 550 also issues control signals 556 to signal a fetch cycle to memory control unit 586. Fetch address register 580 transmits fetch address 19, and memory control 586 transmits control signals 22 over high performance bus 30, which initiates a main memory 40 fetch cycle. The line corresponding to predicted address 521 is fetched from main memory 40. Line 20 is received by receive data register 582 and transferred to either instruction prefetch unit 510 or data prefetch unit 530 over data bus 17, under control of fill prefetch signal 552 or 553 issued by control unit 550, depending upon whether control signals 18 indicate an instruction or a data read sequence. Control then proceeds to block 410, which ends the read request sequence.

If prefetch assist hit on bus 551 is not sensed by control unit 550 at block 360, then control proceeds to block 380, wherein increment register 570 generates next sequential line address 571. Control unit 550 then issues mux control 555 to couple next sequential line address 571 to fetch address register 580. Control unit 550 also issues control signals 556 to signal a fetch cycle to memory control unit 586. Fetch address register 580 transmits fetch address 619, and memory control 586 transmits control signals 622 over high performance bus 30, which initiates a main memory 40 fetch cycle. The next sequential line is then fetched from main memory 40. Next sequential line 20 is received by receive data register 582. Next sequential line 20 is then transferred to either instruction prefetch unit 510 or data prefetch unit 530 over data bus 17, depending upon whether control signals 18 indicate an instruction or a data read sequence. This is done under the control of fill prefetch signal on bus 552 or bus 553 issued by control unit 550. Control then proceeds to block 410, which ends the read request sequence.

If a main cache hit indicated on bus 554 is received at decision block 310, then control transfers to block 340, wherein the desired line is read from main cache unit 540 and supplied to processor 10 over data bus 17. Control then proceeds to block 360, wherein prefetching is performed as discussed above.

If a prefetch buffer hit or main cache hit is not received at decision block 310, then control transfers to block 350, wherein the "missed" line is fetched into main cache unit 540. This occurs when control unit 550 issues control signals 555, which cause multiplexer 560 to couple desired address 516 to fetch address register 580. Control unit 550 also issues control signals 556 to signal a fetch cycle to memory control unit 586. Fetch address register 580 transmits fetch address 619 and memory control 586 transmits control signals 622 over high performance bus 30, which initiates a main memory 40 fetch cycle. The missed line is returned on bus 620, stored in receive data register 582, and transferred to main cache unit 540 and processor 10 over data bus 17. Control unit 550 then issues a fill main cache signal on bus 554, which causes main cache 540 to create a new entry.

At block 390, a next sequential line is prefetched from main memory 40 into the appropriate prefetch buffer. As before, increment register 570 generates next sequential line address 571. Control unit 550 then issues mux control 555 to couple next sequential line address 571 to fetch address register 580. Fetch address register 580 transmits fetch address 619 and memory control 586 transmits control signals 622 over high performance bus 30, which initiates a main memory 40 fetch cycle. The next sequential line is fetched from main memory 40. Next sequential line 20 is received by receive data register 582. Next sequential line 20 is transferred to either instruction prefetch unit 510 or data prefetch unit 530 over data bus 17 under control of a fill prefetch signal on bus 552 or bus 553 issued by control unit 550.

At block 400, a new PAC entry is created when control unit 550 issues a create PAC signal on bus 551. The CAR and DAR of prefetch assist unit 520 are used in conjunction with desired address 516 to create a new PAC entry in the data section of prefetch assist unit 520. A PAC entry is created in the data section by storing desired address 516 as the predicted address (NEXT TAG), along with an associated tag field (PREV TAGS) defined by the last instruction address CAR or data address DAR, depending upon whether control signals 18 indicate an instruction or a data fetch sequence. Control then proceeds to 410, which ends the read request sequence.

Figure 7:
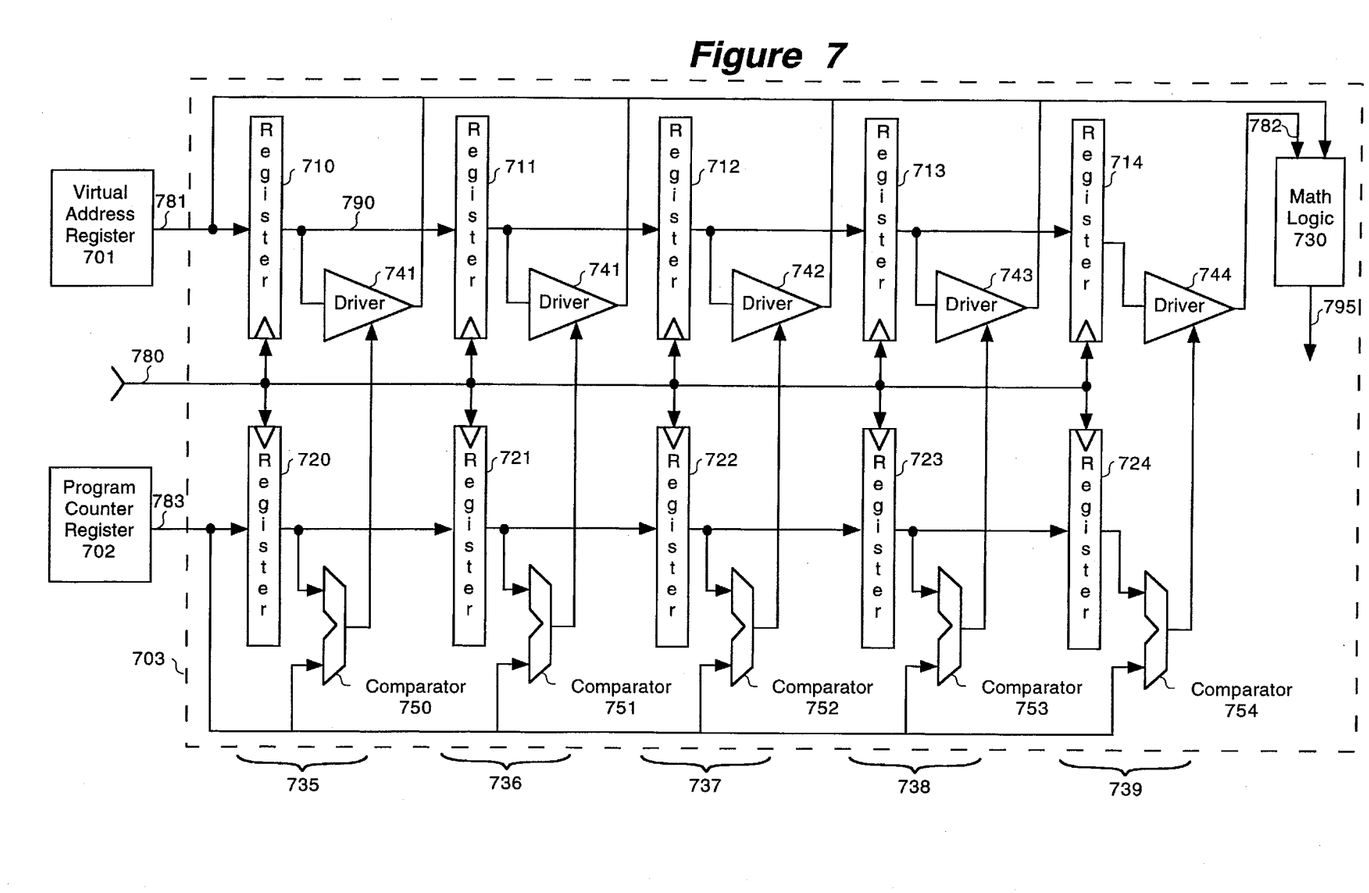
FIG. 7 illustrates stride prediction hardware of a cache subsystem.

FIG. 7 illustrates an example of stride prediction hardware provided by another embodiment of cache subsystem 21 of FIG. 2. A stride predictor 703 stores the last few program counter ("PC") and virtual address ("VA") pairs received from processor 11 during load instructions, and checks for reoccurrences of PC values corresponding to a load instruction. If a PC value reoccurrence is detected by the stride predictor 703, then the corresponding VA value ("$VA_{match}$") is used to generate a predicted VA 795 for prefetching into a data prefetch buffer, such as $D_{pfb}$ 220.

For one embodiment, stride predictor 703 resides on processor chip 11. Registers 701 and 702 are embedded within processor 11 and contain the PC and VA values, respectively. For this example, the last 5 PC and VA pairs are stored.

Stride predictor 703 receives VA 781 and PC 783 from processor 11, along with signal 780, which indicates a load instruction, i.e. a load from memory or a memory read. In this example, the stride predictor 703 is comprised of stages 735 through 739. For stage 735, register 710 stores VA 781 and register 720 stores PC 783, both under control of load signal 780. For stage 736, register 711 stores VA 790 received from register 710 and register 721 stores PC 792 received from register 720, both under control of load signal 780.

Stages 736 through 739 function similarly to stage 735. Each time load signal 780 indicates a load instruction, the VA 781 and PC 783 values are propagated and stored in stages 735 through 739 in a "first in first out" manner.

Comparators 750 through 754 compare the newest PC 783 to the PC output of each stage 735 through 739. For example, in stage 735 comparator 750 compares PC output 792 of register 720 with newest PC 783. If comparator 750 detects a match, then enable signal 791 causes driver 740 to couple the VA 790 from register 710 to $VA_{match}$ 782. In a similar manner, comparator 751 tests the output of register 721 for a match with newest PC 783. If a match is detected by comparator 751, then the output of register 711 is coupled to $VA_{match}$ 782 by driver 741.

Each stage 735 through 739 tests the newest PC 783 to their stored PC value. If any of the outputs of registers 720 through 724 match the newest PC 783, then the corresponding VA stored in registers 710 through 714 is coupled to $VA_{match}$ 782.

Math logic 730 receives $VA_{match}$ 782 and newest VA 781, and generates predicted VA 795 in accordance with the following equation:

$$\text{Predicted VA} = \text{newest VA} + (\text{newest VA} - \text{VA match}) = 2 \times \text{newest VA} - VA_{match}.$$

For example, math logic 730 may in one embodiment comprise a simple adder with one input comprising a logically left shifted newest VA 781 (2×newest VA), and the other input comprising the two's complement of $VA_{match}$ 782. VA 795 can be used for prefetching into a data prefetch buffer, such as $D_{pfb}$ 220.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A cache subsystem for a computer system having a processor and a main memory, comprising:
   (A) a prefetch buffer coupled to the processor and the main memory, wherein the prefetch buffer stores a first data prefetched from the main memory in accordance with a predicted address for a next memory fetch by the processor, wherein the predicted address is generated based upon a last memory fetch from the processor;
   (B) a main cache coupled to the processor and the main memory, wherein the main cache is not coupled to the prefetch buffer and does not receive data from the prefetch buffer, wherein the main cache stores a second data fetched from the main memory in accordance with an address for the last memory fetch by the processor only if the address for the last memory fetch is an unpredictable address, wherein the address for the last memory fetch is the unpredictable address if both of the prefetch buffer and the main cache do not contain the address and the second data associated with the address.

2. The cache subsystem of claim 1, wherein the predicted address is equal to a next sequential address from the address of the last memory fetch from the processor.

3. The cache subsystem of claim 1, further comprising a prefetch assist cache that stores the predicted address for the next memory fetch.

4. The cache subsystem of claim 3, wherein the prefetch buffer generates the predicted address by reading the prefetch assist cache using the address of the last memory fetch from the processor.

5. The cache subsystem of claim 4, wherein the predicted address is equal to a next sequential address from the address of the last memory fetch if the prefetch assist cache does not contain the predicted address.

6. The cache subsystem of claim 1, wherein the each of the first and second data prefetched by the prefetch buffer is a main memory data line from the main memory from the predicted address wherein the main memory data line comprises a plurality of data bytes.

7. The cache subsystem of claim 1, wherein the prefetch buffer comprises:
   instruction prefetch buffer that generates the predicted address for a next instruction fetch by the processor if the last memory fetch is an instruction fetch;
   data prefetch buffer that generates the predicted address for a next data fetch by the processor if the last memory fetch is a data fetch.

8. The cache subsystem of claim 7, further comprising a stride predictor circuit that stores a program counter address and a virtual address corresponding to the program counter address during execution of a load instruction by the processor.

9. The cache subsystem of claim 8, wherein the data prefetch buffer generates the predicted address for the next data fetch by reading the virtual address corresponding to the program counter address from the stride predictor circuit.

10. A computer system, comprising:
(A) a processor;
(B) a main memory;
(C) a cache subsystem coupled to the processor and the main memory, wherein the cache subsystem further comprises
   (i) a prefetch buffer coupled to the processor and the main memory, wherein the prefetch buffer stores a first data prefetched from the main memory in accordance with a predicted address for a next memory fetch by the processor, wherein the predicted address is based upon a last memory fetch from the processor;
   (ii) a main cache coupled to the processor and the main memory, wherein the main cache is not coupled to the prefetch buffer and does not receive data from the prefetch buffer, wherein the main cache stores a second data fetched from the main memory in accordance with an address for the last memory fetch by the processor only if the address for the last memory fetch is an unpredictable address, wherein the address for the last memory fetch is the unpredictable address if both of the prefetch buffer and the main cache do not contain the address and the second data associated with the address.

11. The computer system of claim 10, wherein the predicted address is equal to a next sequential address from the address of the last memory fetch from the processor.

12. The computer system of claim 10, wherein the cache subsystem includes a prefetch assist cache that stores the predicted address for the next memory fetch.

13. The computer system of claim 12, wherein the cache subsystem generates the predicted address by reading the prefetch assist cache using the address of the last memory fetch from the processor.

14. The computer system of claim 13, wherein the predicted address is equal to a next sequential address from the address of the last memory fetch if the prefetch assist cache does not contain the predicted address.

15. The computer system of claim 10, wherein the prefetch buffer further comprises instruction prefetch buffer that generates the predicted address for a next instruction fetch by the processor if the last memory fetch is an instruction fetch;

data prefetch buffer that generates the predicted address for a next data fetch by the processor if the last memory fetch is a data fetch.

16. The computer system of claim 15, wherein the cache subsystem further comprises a stride predictor circuit that stores a program counter address and a virtual address corresponding to the program counter address during execution of a load instruction by the processor.

17. The computer system of claim 16, wherein the data prefetch buffer generates the predicted address for the next data fetch by reading the virtual address corresponding to the program counter address from the stride predictor circuit.

18. A memory access method in a cache subsystem coupled to a process and a main memory in a computer system, comprising the steps of:
(A) receiving an address for a memory fetch from the processor;
(B) determining if the address is an unpredictable address by determining if the address is contained in the cache subsystem, wherein the address is an unpredictable address if the cache subsystem does not contain the address;
(C) if the address is an unpredictable address, then fetching a first data from the main memory into a main cache of the cache subsystem in accordance with the unpredictable address, wherein the main cache only stores data fetched by unpredictable addresses;
(D) generating a predicted address for a next memory fetch by the processor based upon the unpredictable address and prefetching a second data from the main memory from the predicted address and then storing the second data in a prefetch buffer, wherein the main cache is not coupled to the prefetch buffer and does not receive data from the prefetch buffer.

19. The method of claim 18, wherein the step (D) further comprises the step of generating the predicted address equal to a next sequential address from the unpredictable address.

20. The method of claim 18, wherein the step (D) further comprises the step of generating the predicted address by reading a prefetch assist cache using the unpredictable address.

21. The method of claim 20, further comprising the step of generating the predicted address equal to a next sequential address of the unpredictable address if the prefetch assist cache does not contain the predicted address.

* * * * *